US008805623B2

(12) United States Patent
Matsuno et al.

(10) Patent No.: US 8,805,623 B2
(45) Date of Patent: Aug. 12, 2014

(54) ENGINE LIFE PREDICTING APPARATUS AND REFRIGERATING APPARATUS

(75) Inventors: Sumikazu Matsuno, Shiga (JP); Tetsuo Nakata, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 1417 days.

(21) Appl. No.: 12/513,027

(22) PCT Filed: Nov. 1, 2007

(86) PCT No.: PCT/JP2007/071316
§ 371 (c)(1),
(2), (4) Date: Apr. 30, 2009

(87) PCT Pub. No.: WO2008/065848
PCT Pub. Date: Jun. 5, 2008

(65) Prior Publication Data
US 2010/0058785 A1    Mar. 11, 2010

(30) Foreign Application Priority Data

Nov. 27, 2006  (JP) ................................ 2006-318626

(51) Int. Cl.
*G07C 3/00*     (2006.01)
*G06F 11/30*    (2006.01)
(52) U.S. Cl.
USPC ............................... 702/34; 702/64; 702/183
(58) Field of Classification Search
USPC ..................................... 702/64, 181, 183, 34
See application file for complete search history.

(56) References Cited

U.S. PATENT DOCUMENTS

| 6,542,853 | B1 * | 4/2003 | Murakami et al. | 702/183 |
| 2001/0054849 | A1 * | 12/2001 | Rybak | 310/12 |
| 2002/0125052 | A1 * | 9/2002 | Naruse et al. | 180/53.8 |
| 2002/0157414 | A1 * | 10/2002 | Iwanami et al. | 62/239 |
| 2005/0071090 | A1 * | 3/2005 | Katou | 702/34 |
| 2006/0024072 | A1 * | 2/2006 | Kuroki et al. | 399/33 |
| 2006/0061922 | A1 * | 3/2006 | Mihai et al. | 361/20 |
| 2006/0192533 | A1 * | 8/2006 | Kimura et al. | 322/22 |
| 2006/0220608 | A1 * | 10/2006 | Izumi et al. | 318/801 |

FOREIGN PATENT DOCUMENTS

| JP | 6-10748 | A | | 1/1994 |
| JP | 11-211622 | A | | 8/1999 |
| JP | 2000-37095 | A | | 2/2000 |
| JP | 2000037095 | A | * | 2/2000 |
| JP | 2001-11900 | A | | 1/2001 |
| JP | 2001011900 | A | * | 1/2001 |
| JP | 2004-108722 | A | | 4/2004 |
| JP | 2005-137127 | A | | 5/2005 |
| JP | 2005-171940 | A | | 6/2005 |

* cited by examiner

*Primary Examiner* — Janet Suglo
*Assistant Examiner* — Michael Dalbo
(74) *Attorney, Agent, or Firm* — Birch, Stewart, Kolasch & Birch, LLP.

(57) ABSTRACT

A current detector and a voltage detector respectively detect a current value and a voltage value outputted from an engine generator. An operating block determines a weight constant on the basis of the current value and the voltage value, weights the operating time of an engine by using the weight constant, and integrates the weighted operating time to calculate an integral time. A judging block compares the integral time and a reference time, and gives a notification to an indicator when it judges that the integral time exceeds the reference time. Receiving the notification, the indicator makes an external indication. The current detector and the voltage detector can be made of electric circuitry, so that the life of the engine can be predicted at low costs and with high reliability.

17 Claims, 8 Drawing Sheets

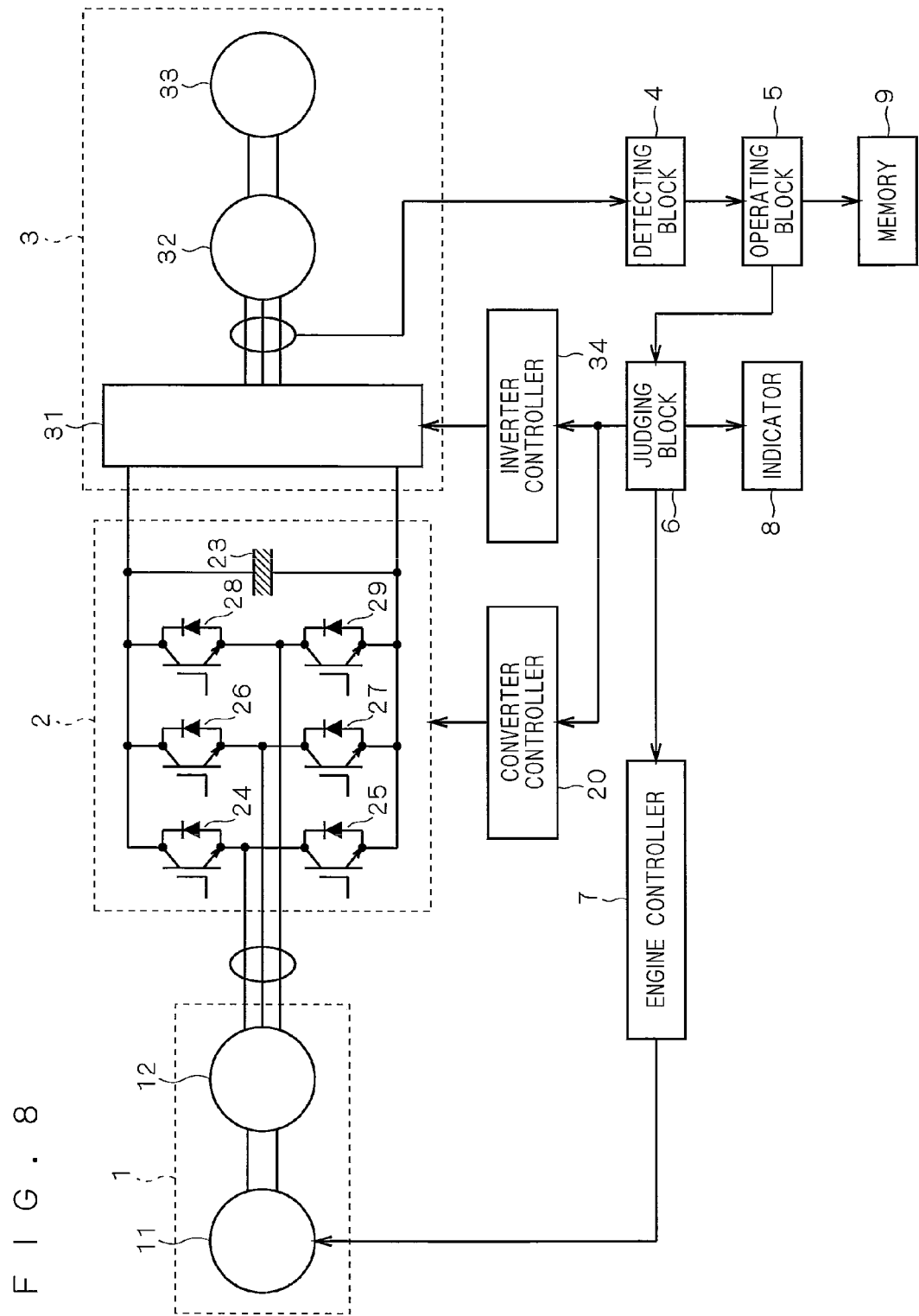

ENGINE LIFE PREDICTING APPARATUS AND REFRIGERATING APPARATUS

TECHNICAL FIELD

The present invention relates to an engine life predicting apparatus and a refrigerating apparatus, and particularly to life prediction using a generator with an engine as a power source.

BACKGROUND ART

Patent Documents 1 to 4 disclose techniques for life prediction of an engine using the number of rotations, output torque, power consumption, etc. of the engine. For example, in Patent Document 1, a sensor for detecting the number of rotations of an engine and a sensor for detecting the rack position detect the number of rotations of the engine and the rack position (a substitutional value of engine torque), a weight is determined on the basis of the detected number of rotations and rack position, the operating time of the engine is weighted by using the weight, and the life of the engine is calculated.

Patent Document 1: Japanese Patent Application Laid-Open No. 11-211622 (1999)
Patent Document 2: Japanese Patent Application Laid-Open No. 06-010748 (1994)
Patent Document 3: Japanese Patent Application Laid-Open No. 2001-011900
Patent Document 4: Japanese Patent Application Laid-Open No. 2005-171940

DISCLOSURE OF THE INVENTION

Problems to be Solved by the Invention

However, the techniques described in Patent Documents 1 to 4 need sensors, like a detector for detecting the number of rotations of the engine and a detector for detecting torque, leading to lower reliability and increased manufacturing costs.

Accordingly, an object of the present invention is to provide an engine life predicting apparatus at low costs and with high reliability.

Means for Solving the Problems

According to a first aspect of the engine life predicting apparatus of the present invention, an engine life predicting apparatus comprises: a detecting block (4) including a current detector (41) that detects a current value outputted from a generator (12) with an engine (11) as a power source, and a voltage detector (42) that detects a voltage value outputted from said generator; an operating block (5) that weights an operating time of said engine by using a weight constant determined on the basis of said current value and said voltage value, and that integrates weighted said operating time to calculate an integral time; and a judging block (6) that judges a residual life of said engine by comparing said integral time and previously at least one set reference values.

According to a second aspect of the engine life predicting apparatus of the present invention, in the engine life predicting apparatus of the first aspect, said detecting block further includes a frequency detector (43) that detects a frequency of alternating current outputted from said generator, and operating block calculates a power value from said current value and said voltage value, and determines said weight constant on the basis of said power value and said frequency.

According to a third aspect of the engine life predicting apparatus of the present invention, the engine life predicting apparatus of the first or second aspect further comprises a converter (2) that converts alternating current outputted from said generator into direct current, and said detecting block is connected to at least an input side of said converter.

According to a fourth aspect of the engine life predicting apparatus of the present invention, the engine life predicting apparatus of the first or second aspect further comprises a converter (2) that converts alternating current outputted from said generator into direct current, and said detecting block is connected to at least an output side of said converter.

According to a fifth aspect of the engine life predicting apparatus of the present invention, the engine life predicting apparatus of any of the first to fourth aspects further comprises a power conversion device (2, 31, 35) that converts alternating-current power outputted from said generator; and a power conversion device controller (20, 34, 36) that restricts at least one of a maximum output power and a maximum output frequency of said power conversion device when said judging block judges that said integral time exceeds said at least one reference values.

According to a sixth aspect of the engine life predicting apparatus of the present invention, in the engine life predicting apparatus of the fifth aspect, said at least one reference values includes a plurality of previously set reference values, and said power conversion device controller restricts at least one of said maximum output power and said maximum output frequency according to each of said plurality of reference values.

According to a seventh aspect of the engine life predicting apparatus of the present invention, the engine life predicting apparatus of the fifth or sixth aspect further comprises a load (32, 33) that is supplied with power from said power conversion device, wherein said detecting block is connected to an output side of said power conversion device, and said current detector a second current value from said power conversion, and said voltage detector a second voltage value from said power conversion, said operating block weights an operating time of said load by using a second weight constant determined on the basis of said second current value and said second voltage value and integrates the weighted operating time of said load to calculate an integral time of said load, and said judging bloc compares said integral time of said load and a previously set at least one second reference values to judge a residual life of said load.

According to an eighth aspect of the engine life predicting apparatus of the present invention, the engine life predicting apparatus of any of the first to seventh aspects further comprises an indicator (8) that makes an external indication when said judging block judges that said integral time exceeds said at least one reference values.

According to a ninth aspect of the engine life predicting apparatus of the present invention, in the engine life predicting apparatus of the eighth aspect, said at least one reference values includes a plurality of previously set reference values, and said indicator makes an indication according to each of said plurality reference values.

According to a tenth aspect of the engine life predicting apparatus of the present invention, the engine life predicting apparatus of any of the first to ninth aspects further comprises an engine controller (7) that restricts at least one of a maximum output and a maximum number of rotations of said engine when said judging block judges that said integral time exceeds said at least one reference values.

According to an eleventh aspect of the engine life predicting apparatus of the present invention, in the engine life predicting apparatus of the tenth aspect, said engine controller stops said engine when said judging block judges that said integral time exceeds said at least one reference values.

According to a twelfth aspect of the engine life predicting apparatus of the present invention, in the engine life predicting apparatus of the tenth aspect, said at least one reference values includes a plurality of previously set reference values, and said engine controller restricts at least one of the maximum output and the maximum number of rotations according to each of said plurality of reference values.

According to a thirteenth aspect of the engine life predicting apparatus of the present invention, the engine life predicting apparatus of the third or fourth aspect further comprises a converter controller (20) that restricts a maximum output voltage of said converter when said judging block judges that said integral time exceeds said at least one reference values.

According to a fourteenth aspect of the engine life predicting apparatus of the present invention, in the engine life predicting apparatus of the thirteenth aspect, said at least one reference values includes a plurality of previously set reference values, and said converter controller restricts the maximum output voltage according to each of said plurality of reference values.

According to a fifteenth aspect of the engine life predicting apparatus of the present invention, in the engine life predicting apparatus of any of the first to fourteenth aspects, said generator drives a motor (32).

According to a sixteenth aspect of the engine life predicting apparatus of the present invention, the engine life predicting apparatus of any of the first to fifteenth aspects further comprises a nonvolatile recording medium (9) that is replaceable and that is recorded said integral time.

According to a first aspect of the refrigerating apparatus of the present invention, a refrigerating apparatus comprises the engine life predicting apparatus according to any of the first to sixteenth aspects.

Effects of the Invention

According to the first aspect of the engine life predicting apparatus of the present invention, the detecting block can be made of electric circuitry, and so an engine life predicting apparatus can be provided at low costs and with high reliability.

According to the second aspect of the engine life predicting apparatus of the present invention, the frequency of the alternating current outputted from the generator is in a unique relation with the number of rotations of the engine, and the life prediction can be made taking the number of rotations into account, so that the accuracy of the life prediction is enhanced.

According to the third aspect of the engine life predicting apparatus of the present invention, the detecting block makes detection on the input side of the converter, and so the frequency of the alternating current can be detected easily.

According to the fourth aspect of the engine life predicting apparatus of the present invention, it is possible to enhance the detecting accuracy because the detecting block can measure the voltage on the basis of the low output potential of the converter.

According to the fifth, tenth, and thirteenth aspects of the engine life predicting apparatus of the present invention, it is possible to delay the time at which the engine stops as its life expires.

According to the sixth, twelfth, and fourteenth aspects of the engine life predicting apparatus of the present invention, it is possible to more minutely delay the time at which the engine stops as its life expires.

According to the seventh aspect of the engine life predicting apparatus of the present invention, it is possible to further predict the life of the load.

According to the eighth aspect of the engine life predicting apparatus of the present invention, the user can easily confirm the life of the engine.

According to the ninth aspect of the engine life predicting apparatus of the present invention, the user can minutely know the life of the engine to take quick measures.

According to the eleventh aspect of the engine life predicting apparatus of the present invention, the engine is stopped before its life expires, and thus to prevent failures of the engine caused as its life expires.

According to the fifteenth aspect of the engine life predicting apparatus of the present invention, the detecting block can be made of electric circuitry, and there is no need for a sensor for measuring motor torque.

According to the sixteenth aspect of the engine life predicting apparatus of the present invention, when the detecting block, operation block, judging block, and recording medium are provided on the same substrate, for example, even when the substrate is replaced due to a failure, the recording medium can be attached to the new substrate so that the integral time is not lost.

According to the first aspect of the refrigerating apparatus of the present invention, the detecting block can be made of electric circuitry, and so a refrigerating apparatus that predicts the life of the engine can be provided at low costs and with high reliability.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a schematic diagram illustrating the configuration of a refrigerating apparatus to which an engine life predicting apparatus of a fifth preferred embodiment is applied.

BEST MODE FOR CARRYING OUT THE INVENTION

Figure 1:
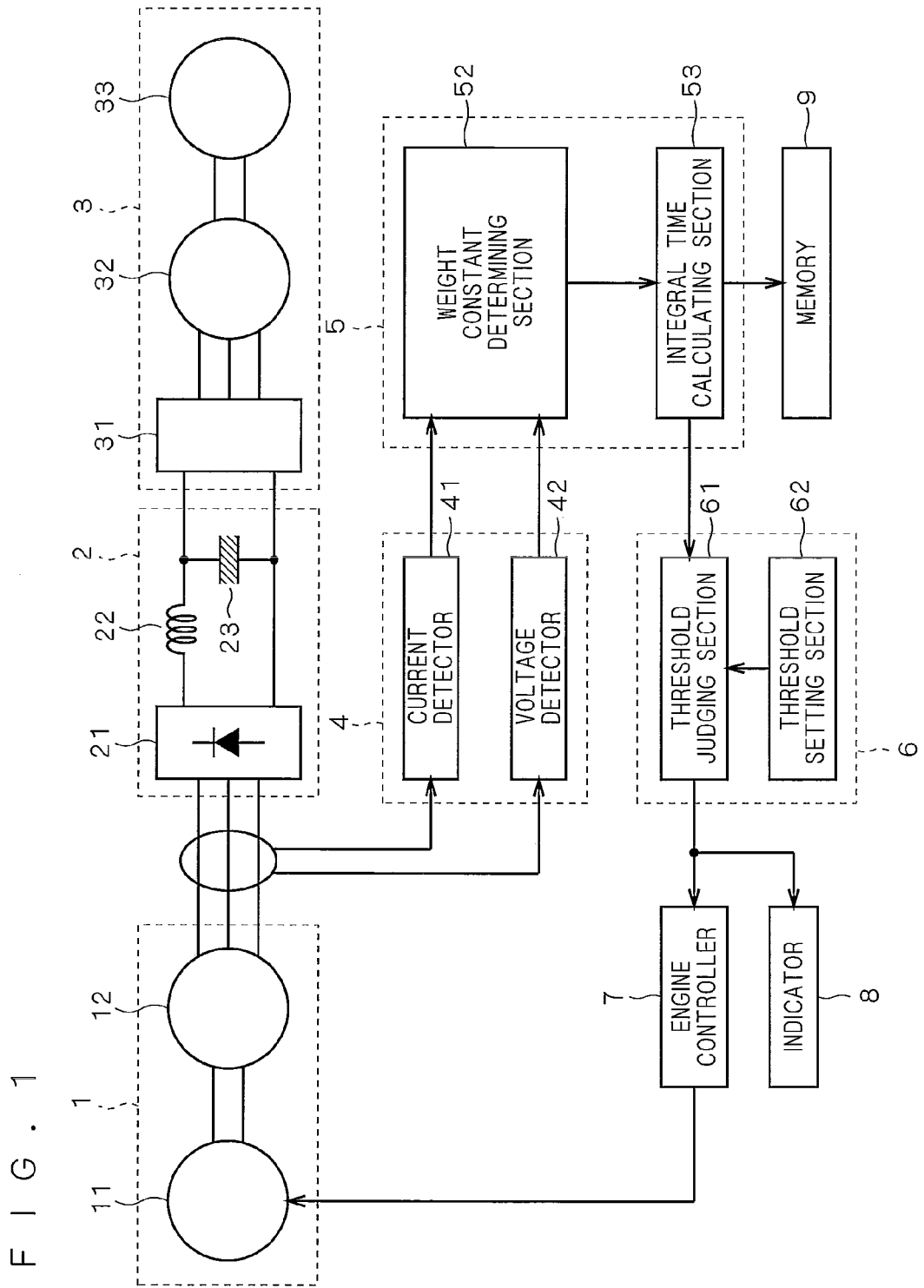
FIG. 1 is a schematic diagram illustrating the configuration of a refrigerating apparatus to which an engine life predicting apparatus of a first preferred embodiment is applied.

The engine life predicting apparatus according to the present invention will now be described referring to the drawings. Like reference characters denote like or corresponding parts, and the same contents will not be described repeatedly.

First Preferred Embodiment

FIG. 1 is a diagram schematically illustrating the configuration of a refrigerating apparatus to which an engine life predicting apparatus according to a first preferred embodiment of the present invention is applied.

This refrigerating apparatus includes an engine generator 1, a converter 2, a compressor driving block 3, a detecting block 4, an operating block, 5, a judging block 6, an engine controller 7, an indicator 8, and a nonvolatile memory 9. This refrigerating apparatus is provided in, e.g. a trailer, and includes a mechanism for cooling the inside of the trailer's container (heat exchangers, fans, etc.), but they are not graphically shown because they are not related to the essence of the present invention.

The engine generator 1 includes an engine 11 and a generator 12. The generator 12 is driven with the engine 11 as a power source, to generate three-phase alternating current and supply it to the converter 2, for example. Alternatively, the generator 12 may generate single-phase alternating current, and it can be a generator of any kind, such as a permanent magnet field type generator, induction generator, wound-field generator, reluctance generator, etc.

The converter 2 includes a diode bridge 21, a reactance 22, and a smoothing capacitor 23. The diode bridge 21 converts the alternating-current voltage from the engine generator 1 into direct-current voltage. The reactance 22 reduces ripple of the direct-current voltage from the diode bridge 21. The smoothing capacitor 23 smoothes the direct-current voltage from the diode bridge 21.

The compressor driving block 3 includes an inverter 31, a motor 32, and a compressor 33. The inverter 31 is controlled by an inverter controller not shown, and converts the direct current from the converter 2 into arbitrary alternating current, and supplies it to the motor 32. The motor 32 rotates by receiving the alternating current from the inverter 31, to drive the compressor 33. The compressor 33 compresses refrigerant and causes it to circulate in a refrigerant circuit not shown.

The detecting block 4 is connected to the input side of the converter 2, and includes a current detector 41 and a voltage detector 42. The current detector 41 detects the current value outputted from the engine generator 1. The voltage detector 42 detects the voltage value outputted from the engine generator 1.

The operating block 5 includes a weight constant determining section 52 and an integral time calculating section 53.

Figure 2:
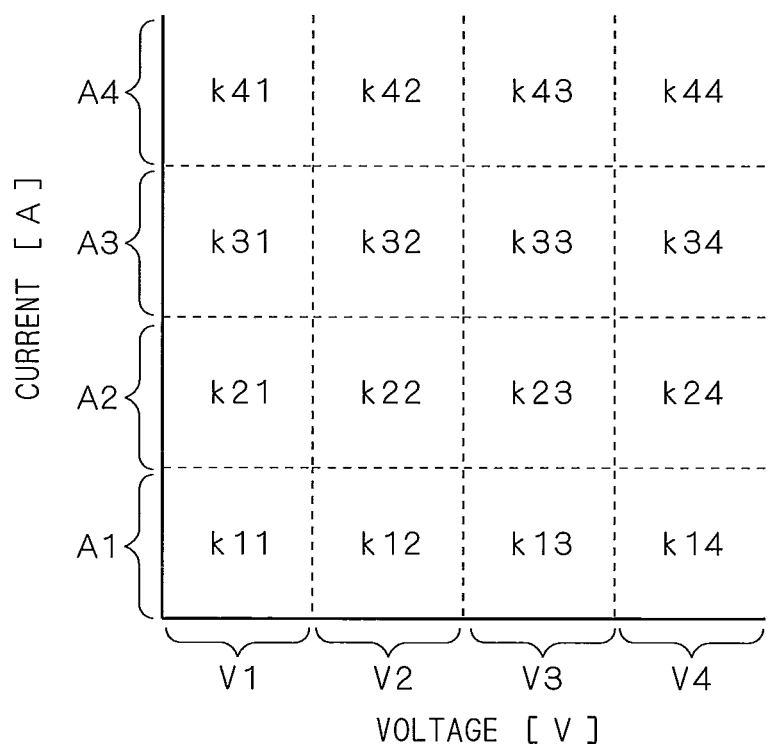
FIG. 2 is a diagram illustrating a weighting table.

The weight constant determining section 52 determines a weight constant on the basis of the current value detected by the current detector 41 and the voltage value detected by the voltage detector 42. Specifically, FIG. 2 shows an example of a weighting table used to determine the weight constant. In the weighting table, the horizontal axis shows the voltage value and the vertical axis shows the current value, and the voltage value and the current value are respectively divided into a plurality of ranges. Weight constants are set in the individual regions specified by the combinations of the voltage value ranges and current value ranges.

Specifically, in the weighting table shown in FIG. 2, the voltage value is divided into four ranges Vi (i=1 to 4), and the current value is divided into four ranges Aj (j=1 to 4), and weight constants kij are previously set in the regions specified by the combinations of the voltage value ranges Vi and current value ranges Aj.

The weight constants kij are obtained by actually measuring the life Lij of the engine 11 under conditions defined by all combinations of the voltage value ranges V1 to V4 and the current value ranges A1 to A4, for example. Specifically, for example, the weight constants kij are set such that kij·Lij takes a constant value (e.g. a mean value of Lij) for all combinations. However, it is not always necessary to actually measure the life for all combinations, but the life may be measured only under major conditions to determine the weight constants under those conditions, and the other weight constants may be obtained by approximation.

The weight constants kij differ depending on characteristics of the engine 11, but they generally become larger toward the upper right corner in the weighting table where the load on the engine 11 is heavier.

By using the weighting table, the weight constant determining section 52 determines the weight constant kij specified by the combination of the current value detected by the current detector 41 and the voltage value detected by the voltage detector 42.

On the basis of the weight constant kij determined by the weight constant determining section 52, the integral time calculating section 53 weights the operating time of the engine 11 and integrates the weighted operating time to calculate an integral time. Specifically, when the engine 11 operates for an operating time tij under a condition where the weight constant is kij (the voltage value is in the range Vi and the current value is in the range Aj), for example, the integral time calculating section 53 calculates the integral time T according to Expression below. Where symbol Σ indicates the sum total about the subscripts i, j.

$$T = \Sigma(kij \cdot tij) \quad (1)$$

Also, the integral time calculating section 53 records the calculated integral time T into the nonvolatile memory 9.

The judging block 6 includes a threshold judging section 61 and a threshold setting section 62. The threshold judging section 61 compares the integral time T calculated by the integral time calculating section 53 and a previously set reference time, and predicts the residual life of the engine 11.

The threshold setting section 62 sets the reference time. Specifically, the reference time is set in addition when the weight constants are previously set by actual measurement. For example, the reference time is set at 100 hours before kij·Lij (e.g. a mean value of Lij).

Then, when the threshold judging section 61 judges that the integral time T exceeds the previously set reference time, it gives a notification of that fact to the engine controller 7 and the indicator 8.

Receiving the notification, the engine controller 7 restricts at least one of the maximum number of rotations and the maximum output of the engine 11. This operation can delay the time at which the engine 11 stops as its life expires. Also, since the output of the engine 11 is restricted, the output of the compressor 33 is restricted as a result, which also can delay the time at which the compressor 33 stops as its life expires.

Also, receiving the notification, the indicator 8 externally indicates, e.g. with sound or display, that the integral time has exceeded the reference time. This operation enables the user to recognize that the life of the engine 11 is expiring, and to be urged to take measures, such as maintenance.

In this way, the residual life of the engine 11 is predicted by detecting the current and voltage outputted from the engine generator 1. It is possible to provide a life predicting apparatus with high reliability because the detecting block 4 can be made of electric circuitry. It is also possible to provide a life predicting apparatus at low costs because no detectors are needed for detecting the number of rotations, torque, etc. of the engine 11.

According to the present invention, a plurality of reference times may be set. For example, the threshold judging section 61 compares reference times T1, T2, T3 (T1<T2<T3) set by the threshold setting section 62 and the integral time T calculated by the integral time calculating section 53. Then, when the integral time T exceeds the reference time T1, it gives a notification of that fact to the engine controller 7 and the indicator 8.

Receiving the notification of the fact that the integral time T has exceeded the reference time T1, the engine controller 7 restricts the maximum number of rotations of the engine 11 to N1, and/or restricts the maximum output to P1. Also, receiving the same notification, the indicator 8 makes an external indication with sound or display for caution, for example.

When the integral time T exceeds the reference time T2, the threshold judging section 61 gives a notification of that fact to the engine controller 7 and the indicator 8. Receiving the notification of the fact that the integral time T has exceeded the reference time T2, the engine controller 7 restricts the maximum number of rotations of the engine 11 to N2 (<N1), and/or restricts the maximum output to P2 (<P1). Receiving the same notification, the indicator makes an external indication with sound or display for warning, for example.

When the integral time T exceeds the reference time T3, the threshold judging section 61 gives a notification of that fact to the engine controller 7 and the indicator 8. Receiving the notification that the integral time T has exceeded the reference time T3, the engine controller 7 stops the engine 11. Also, receiving the same notification, the indicator makes an external indication with sound or display to indicate that the engine 11 has been stopped because its life is expiring.

This makes it possible to minutely prolong the residual life of the engine 11, and to allow the user to minutely know the residual life of the engine 11 to take quick measures. This also makes it possible to prevent failures of the engine 11 because the engine 11 is stopped before the life of the engine 11 expires. Furthermore, also in this case, the residual life of the compressor 33 can be minutely prolonged as a result, and failures of the compressor 33 caused as its life expires can be prevented.

When the indicator 8 is provided in the cab of a trailer, for example, it is possible to directly make the user recognize the caution, warning, stoppage, etc.

Also, according to the present invention, the nonvolatile memory 9 may be detachably attached to the refrigerating apparatus. For example, when the life predicting apparatus is replaced, the nonvolatile memory 9 used before the replacement can be detached and attached to the new life predicting apparatus, so that the residual life of the engine 11 can be predicted without losing the existing integral time.

Second Preferred Embodiment

Figure 3:
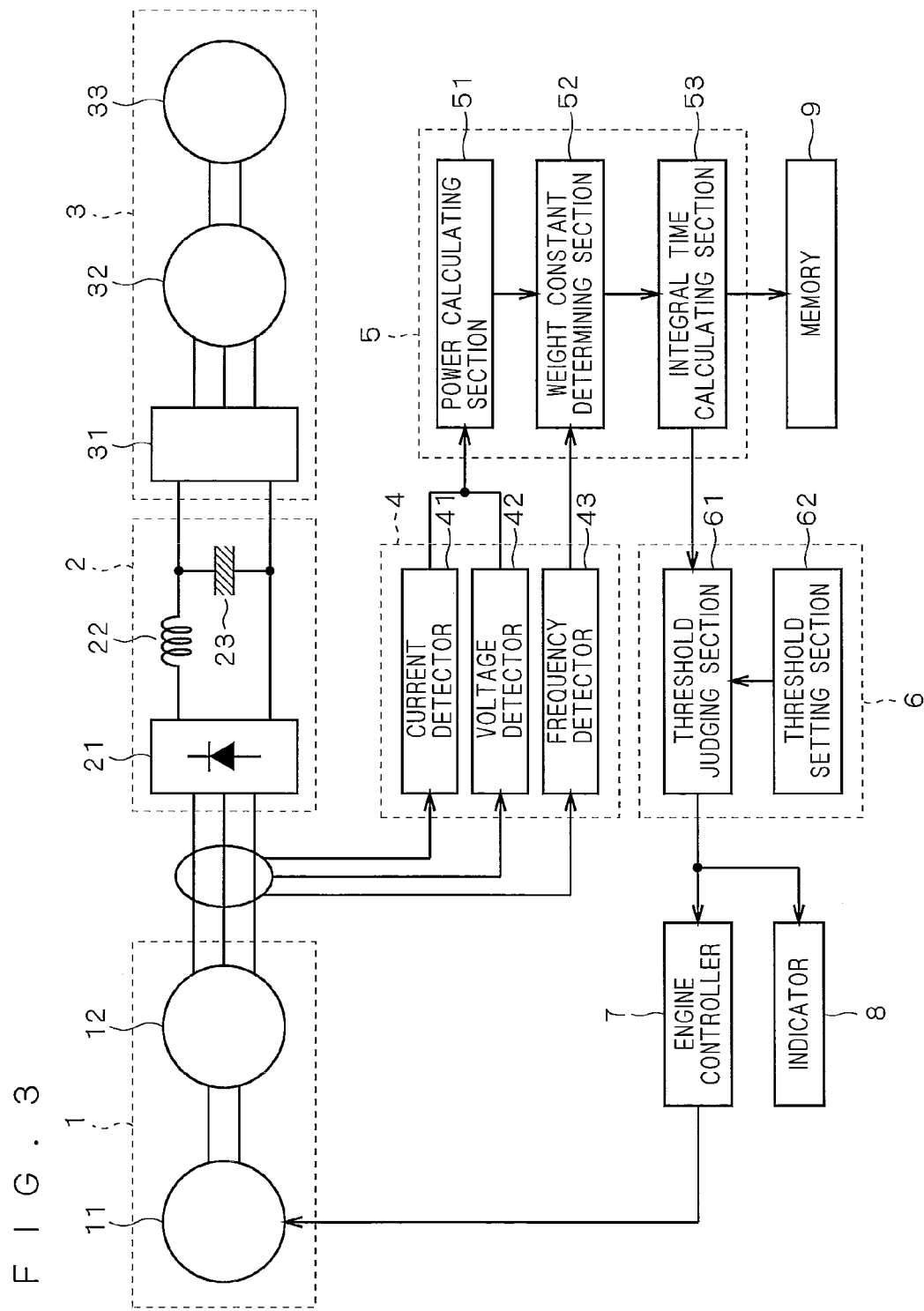
FIG. 3 is a schematic diagram illustrating the configuration of a refrigerating apparatus to which an engine life predicting apparatus of a second preferred embodiment is applied.

FIG. 3 is a diagram schematically illustrating the configuration of a refrigerating apparatus to which an engine life predicting apparatus of a second preferred embodiment of the present invention is applied. As compared with that of the first preferred embodiment, the detecting block 4 further includes a frequency detector 43, and the operating block 5 further includes a power calculating section 51.

The frequency detector 43 detects the frequency of the alternating-current voltage outputted from the engine generator 1.

The power calculating section 51 calculates the power by using the current value detected by the current detector 41 and the voltage value detected by the voltage detector 42.

Figure 4:
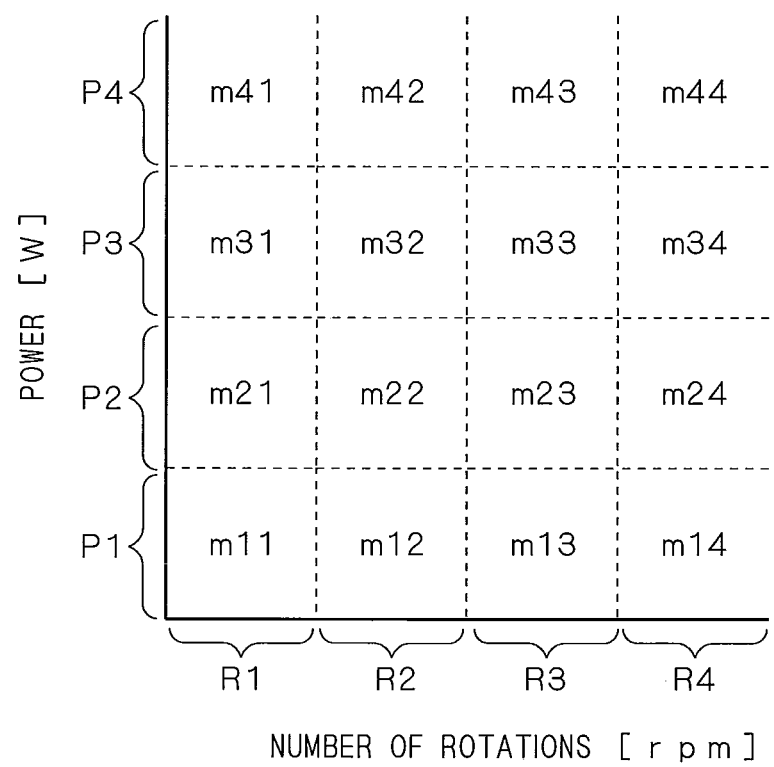
FIG. 4 is a diagram illustrating a weighting table.

The weight constant determining section 52 calculates the number of rotations of the engine 11 on the basis of the frequency detected by the frequency detector 43, and determines the weight constant on the basis of the power calculated by the power calculating section 51 and the number of rotations. Specifically, FIG. 4 shows an example of a weighting table used to determine the weight constant. In the weighting table, the horizontal axis shows the number of rotations, and the vertical axis shows the power, and the number of rotations and power are each divided into a plurality of ranges. Then, weight constants are set in the individual regions specified by the combinations of the ranges of the number of rotations and the ranges of power.

Specifically, in the weighting table illustrated in FIG. 4, the number of rotations is divided into four regions Ri (i=1 to 4), and the power is divided into four regions Pj (j=1 to 4), and weight constants mij are previously set in the regions specified by the combinations of the ranges Ri of the number of rotations and the ranges Pj of power. The weight constants mij are obtained by measuring the life Lij under the conditions of all combinations of the ranges R1 to R4 of the number of rotations and the ranges P1 to P4 of power, for example.

Specifically, the weight constants mij are set such that mij·Lij takes a constant value (e.g. a mean value of Lij) for all combinations, for example. It is not always necessary to measure the life for all combinations, but the life may be measured only under major conditions to determine the weight constants under those conditions, and the other weight constants may be obtained by approximation.

Then, by using the weighting table, the weight constant determining section 52 determines the weight constant mij that is specified by the combination of the number of rotations calculated on the basis of the frequency detected by the frequency detector 43 and the power calculated by the power calculating section 51.

On the basis of the weight constant mij determined by the weight constant determining section 52, the integral time calculating section 53 weights the operating time of the engine 11, and integrates the weighted operating time to calculate the integral time. Specifically, when the engine 11 operates for an operating time tij under a condition where the weight constant is mij (the number of rotations is in the range Ri and the power is in the range Pj), for example, the integral time calculating section 53 obtains the integral time T according to Expression below. Where symbol Σ indicates the sum total about the subscripts i, j.

$$T = \Sigma(mij \cdot tij) \quad (2)$$

Thus, the residual life of the engine 11 can be predicated on the basis of the alternating-current power and frequency outputted from the engine generator 1. The accuracy of life predication can be enhanced because the life predication takes into account the number of rotations of the engine.

Third Preferred Embodiment

Figure 5:
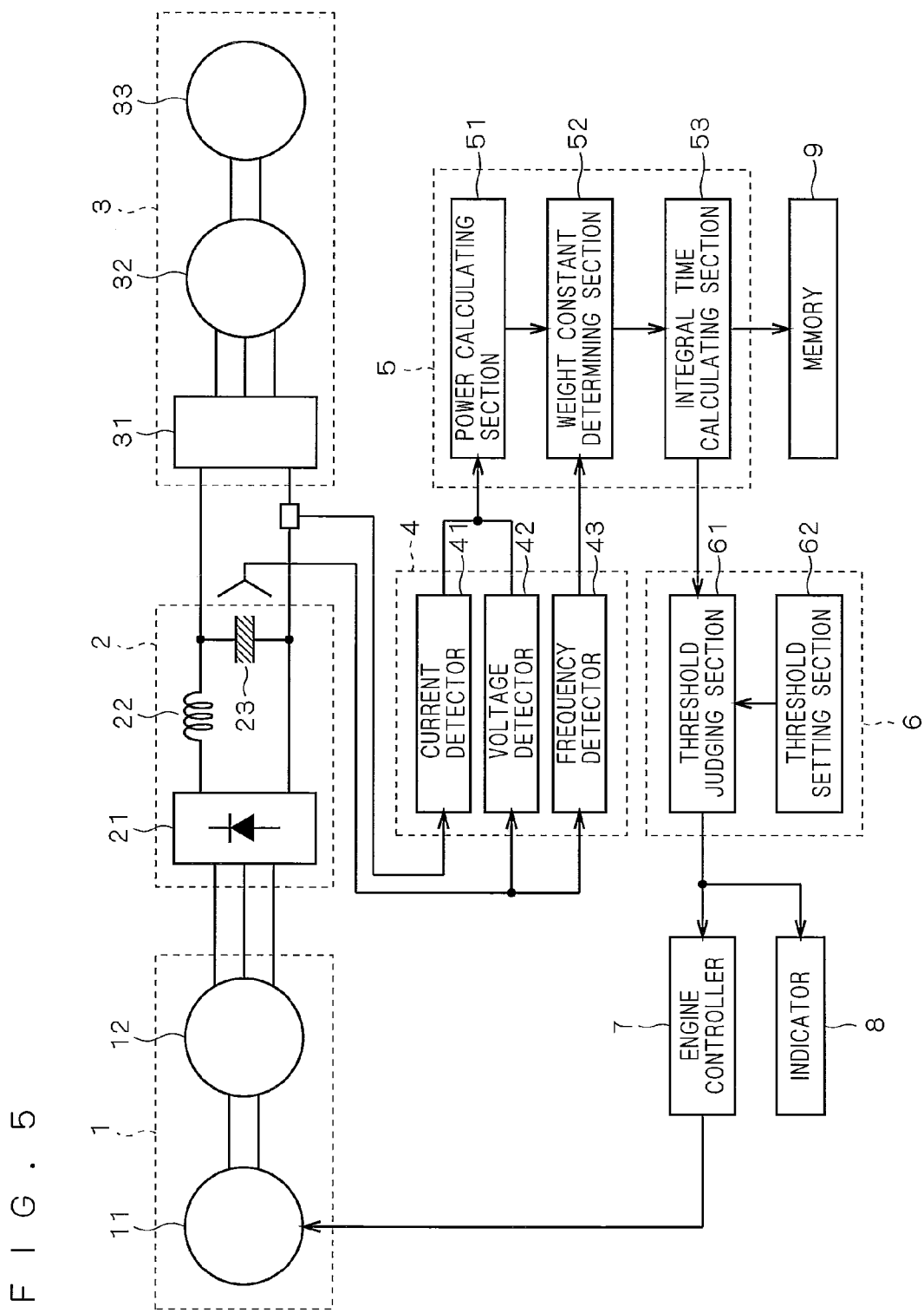
FIG. 5 is a schematic diagram illustrating the configuration of a refrigerating apparatus to which an engine life predicting apparatus of a third preferred embodiment is applied.

FIG. 5 is a diagram schematically illustrating the configuration of a refrigerating apparatus to which an engine life predicting apparatus of a third preferred embodiment of the present invention is applied. As compared with that of the second preferred embodiment, a detecting block 4 detects the direct current outputted from the converter 2.

A current detector 41 detects the current value outputted from the converter 2 on the low potential side. A voltage detector 42 detects the voltage across the high potential and low potential outputted from the converter 2.

A frequency detector 43 detects the frequency of the alternating-current voltage from the engine generator 1 by detecting the frequency of ripple of the direct-current voltage outputted from the converter 2. When the generator 12 is a three-phase electric rotating machine, the frequency of ripple of the direct-current voltage from the converter 2 is usually six times the frequency of the alternating-current voltage from the engine generator 1.

Then, as in the second preferred embodiment, a power calculating section 51 calculates the power by using the current value detected by the current detector 41 and the voltage value detected by the voltage detector 42. A weight constant determining section 52 determines the weight constant on the basis of the power calculated by the power calculating section 51 and the number of rotations of the engine 11 calculated from the frequency detected by the frequency detector 43. The weight constants are set by a method similar to that of the second preferred embodiment, but it is needless to say that the weight constants are set on the basis of the power and frequency outputted from the converter 2.

In this way, the detecting block 4 detects the direct current outputted from the converter 2, and the residual life of the engine 11 can be predicted on the basis of the detected current value, voltage value, and frequency. Also, the accuracy of the detection by the detecting block 4 is enhanced because the voltage can be detected on the basis of the low potential side of the voltage outputted from the converter 2.

Also, usually, the current detector 41 and voltage detector 42 are already provided to control the inverter 31, so that they can be used also for this purpose to reduce manufacturing costs.

Detecting the frequency is easy when the detecting block 4 detects the alternating current between the engine generator 1 and the converter 2 as described in the second preferred embodiment.

The third preferred embodiment has been described by using the detecting block 4 and the operating block 5 of the second preferred embodiment, but the detecting block 4 and the operating block 5 of the first preferred embodiment may be used. In this case, the method of setting weight constants uses the table shown in FIG. 2.

Fourth Preferred Embodiment

Figure 6:
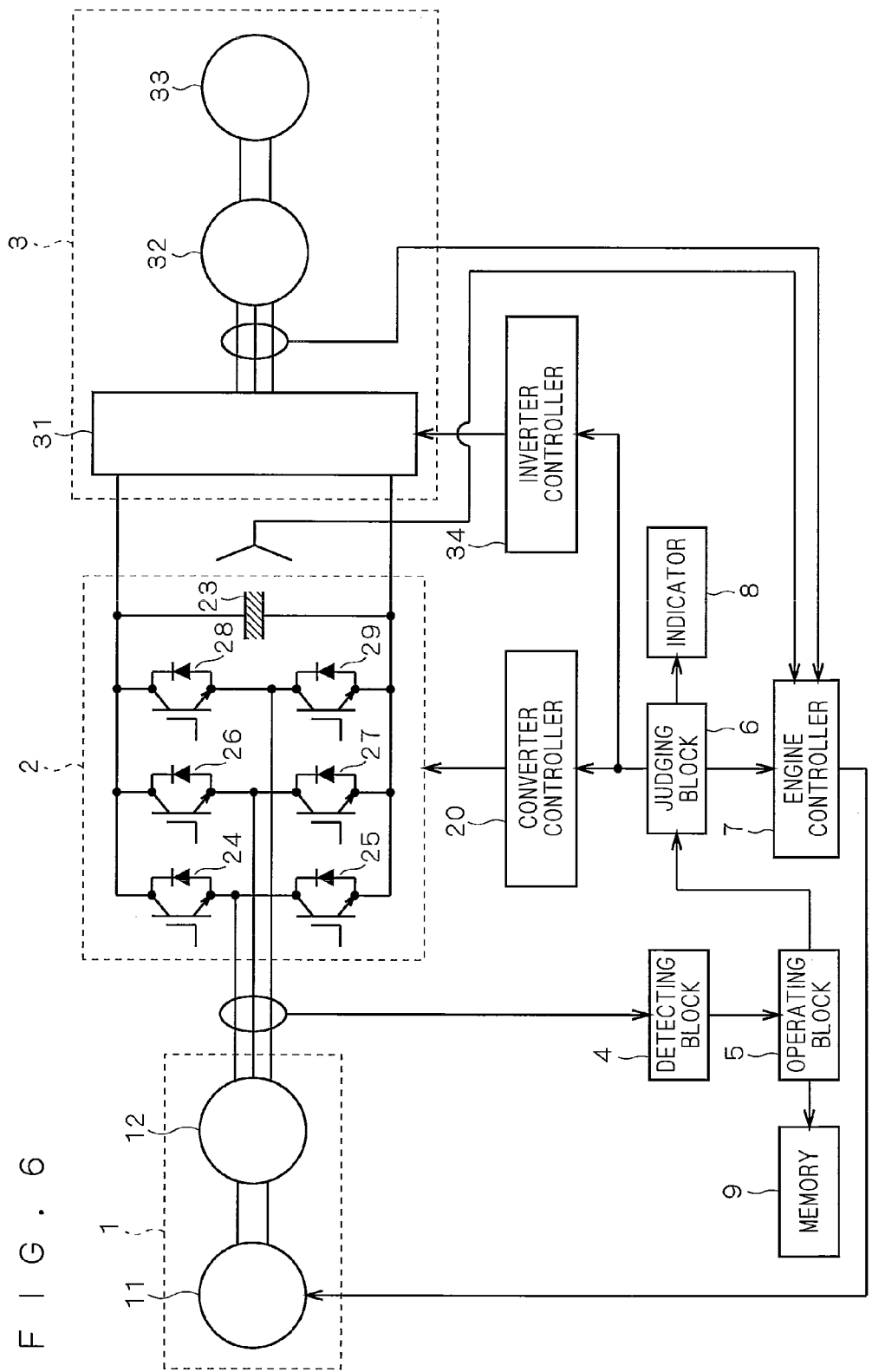
FIG. 6 is a schematic diagram illustrating the configuration of a refrigerating apparatus to which an engine life predicting apparatus of a fourth preferred embodiment is applied.

FIG. 6 is a diagram schematically illustrating the configuration of a refrigerating apparatus to which an engine life predicting apparatus of a fourth preferred embodiment is applied. In the refrigerating apparatuses of the first to third preferred embodiments, the converter 2 is formed of a rectifier including the diode bridge 21. In the fourth preferred embodiment, the converter 2 includes switch elements 24 to 29 and a smoothing capacitor 23. Also, the converter 2 is controlled by a converter controller 20. Also, the inverter 31 is controlled by an inverter controller 34.

The switches 24 to 29 are each formed of a parallel connection of a transistor and a free-wheeling diode. A set of series-connected switch elements 24 and 25, a set of switch elements 26 and 27, and a set of switch elements 28 and 29, are each connected in parallel. The switch elements 24 to 29 are each appropriately controlled by the converter controller 20, and convert the alternating current outputted from the engine generator 1 into direct current.

Also, an engine controller 7 controls the number of rotations of the engine 11 according to the load on the engine generator 1. In a specific example, the output voltage of the converter 2 and the output voltage or output frequency of the inverter 31 are detected, and the number of rotations of the engine 11 is controlled according to the output voltages. Such an engine controller 7 enables proper operation according to the load on the engine 11. The converter controller 20 controls the converter 2 according to the variation of the number of rotations of the engine 11 so that desired output voltage is outputted from the converter 2.

Then, as in the first preferred embodiment, the detecting block 4 detects the current value and voltage value outputted from the engine generator 1, and the operating block 5 weights the operating time of the engine 11 by using a weight constant determined on the basis of the current value and voltage value, and integrates the weighted operating time to calculate the integral time.

The judging block 6 compares the integral time calculated by the operating block 5 and a reference time to predict the residual life of the engine 11. For example, when the engine controller 7 controls the number of rotations of the engine 11 according to the output voltage of the converter 2, the judging block 6 gives a notification to the converter controller 20 when it judges that the integral time exceeds the reference time.

Receiving the notification, the converter controller 20 restricts the maximum output voltage from the converter 2.

The engine controller 7 thus controls the number of rotations of the engine 11 according to the output voltage from the converter 2, and so the maximum number of rotations of the engine 11 is restricted as a result, and the time at which the engine 11 stops as its life expires can be delayed. Also, restricting the maximum output voltage of the converter 2 restricts the output voltage from the inverter 31, and therefore the residual life of the compressor 33 can be prolonged.

As in the first preferred embodiment, the judging block 6 may give a notification directly to the engine controller 7 when it judges that the integral time exceeds the reference time. Then, receiving the notification, the engine controller 7 restricts at least one of the maximum output and the maximum number of rotations of the engine 11.

When the engine controller 7 controls the number of rotations of the engine 11 on the basis of the output voltage or output frequency of the inverter 31, the judging block 6 gives a notification to the inverter controller 34 when it judges that the integral time exceeds the reference time. Receiving the notification, the inverter controller 34 restricts at least one of the maximum output power and maximum output frequency of the inverter 31. This can prolongs the residual life of the compressor 33.

Also, the engine controller 7 thus controls the number of rotations of the engine 11 according to the output voltage or output frequency of the inverter 31, and so the maximum number of rotations of the engine 11 is restricted as a result, and thus the time at which the engine 11 stops as its life expires can be delayed.

In the first to third preferred embodiments, the inverter 31 is controlled by an inverter controller 34 thought not graphically shown. Accordingly, when the engine controller 7 controls the number of rotations of the engine 11 according to the output voltage or output frequency of the inverter 31, at least one of the maximum output power and maximum output frequency of the inverter 31 may be restricted also in the first to third preferred embodiments.

Figure 7:
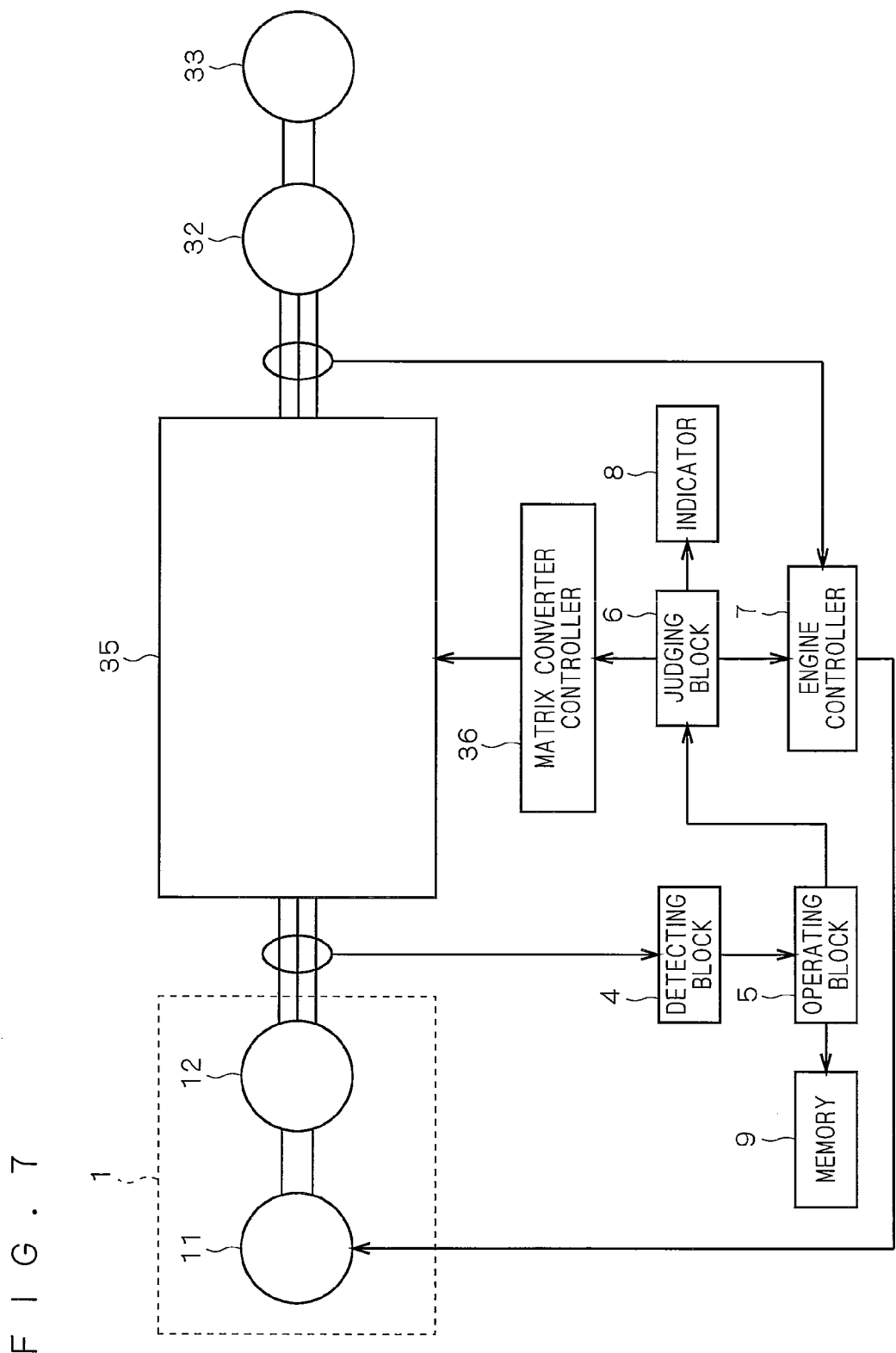
FIG. 7 is a schematic diagram illustrating the configuration of a refrigerating apparatus to which an engine life predicting apparatus of the fourth preferred embodiment is applied.

Also, as shown in FIG. 7, the part including the converter 2 and the inverter 31 may be formed of a matrix converter 35. The matrix converter 35 is controlled by a matrix converter controller 36, and the alternating current from the engine generator 1 can be converted directly into arbitrary alternating current and supplied to the motor 32. Then, the detecting block 4 detects the alternating current on the input side of the matrix converter 35, and the operating block 5 and the judging block 6 operate to predict the residual life of the engine 11. Specifically, when the judging block 6 judges that the integral time calculated by the operating block 5 exceeds the reference time, the matrix converter controller 36 restricts at least one of the maximum output power and maximum frequency power outputted from the matrix converter 35. This can prolong the residual life of the engine 11.

Also, as in the first preferred embodiment, the judging block 6 may give a notification directly to the engine controller 7 when it judges that the integral time exceeds the reference time. Then, receiving the notification, the engine controller 7 restricts at least one of the maximum output and the maximum number of rotations of the engine 11.

Also, as in the first preferred embodiment, a plurality of reference times may be provided and the maximum output may be restricted according to each of the reference times. The fourth preferred embodiment has been described by using the detecting block 4 and the operating block 5 of the first preferred embodiment, but the detecting block 4 and the operating block 5 of the second or third preferred embodiment may be used.

Fifth Preferred Embodiment

FIG. 8 illustrates a refrigerating apparatus to which an engine life predicting apparatus of a fifth preferred embodiment of the present invention is applied. While the first to fourth preferred embodiments predict the residual life of the engine 11, the fifth preferred embodiment is capable of predicting the residual life of the compressor.

Specifically, a detecting block 4 detects the alternating current outputted from the inverter 31. Specifically, a current detector 41 detects the current value outputted from the inverter 31, and a voltage detector 42 detects the voltage value outputted from the inverter 31.

Then, by using a weight constant determined on the basis of the current value detected by the current detector 41 and the voltage value detected by the voltage detector 42, an operating block 5 weights the operating time of the compressor 33 and integrates the weighted operating time to calculate an integral time. The weight constants are set by a method similar to that of the first preferred embodiment, but the weight constants are of course set by actually measuring the life of the compressor 33 under conditions of the combinations of the current value and voltage value outputted from the inverter 31.

Then, a judging block 6 compares the integral time and a reference time, and gives a notification to the engine controller 7, indicator 8, converter controller 20, and inverter controller 34 when the integral time exceeds the reference time. It is not always necessary for the judging block 6 to give a notification to all of them, but it may give a notification to at least one of them.

Receiving the notification, the indicator 8 externally indicates, with sound or display, that the integral time of the compressor has exceeded the reference time. This enables the user to recognize that the life of the compressor 33 is expiring.

Receiving the notification, the engine controller 7 restricts at least one of the maximum output and maximum number of rotations of the engine 11, or stops the engine 11. Receiving the notification, the converter controller 20 restricts the maximum output voltage of the converter 2. Receiving the notification, the inverter controller 34 restricts at least one of the maximum output power and maximum frequency of the inverter 31. This delays the time at which the compressor 33 stops as its life expires, and it is possible, by stopping the engine 11, to prevent failures caused as the life of the compressor expires.

The fifth preferred embodiment has been described by using the detecting block 4 and the operating block 5 of the first preferred embodiment, but the detecting block 4 and the operating block 5 of the second preferred embodiment may be used. Also, the part including the converter 2 and the inverter 31 may be formed of a matrix converter.

The fifth preferred embodiment may be applied to any of the first to fourth preferred embodiments. That is, the lives of the engine 11 and the compressor 33 may be predicted by detecting the output from the engine generator 1 or the converter 2, also detecting the output from the inverter 31, determining a weight constant for the engine 11 and a weight constant for the compressor 33 with different weighting tables, comparing the integral time of the engine 11 and a reference time for the engine 11, and comparing the integral time of the compressor 33 and a reference time for the compressor 33.

According to the present invention, any of the first to fifth preferred embodiments can be applied in combination. Also, aspects in which the engine life predicting apparatus of the present invention is applied to a refrigerating apparatus have been described, but they are illustrative and not restrictive; the engine life predicting apparatus of the present invention can be applied to any apparatuses that are supplied with power by an engine generator.

While the invention has been described in detail, the foregoing description is in all aspects illustrative and not restrictive. It is understood that numerous other modifications and variations can be devised without departing from the scope of the invention.

The invention claimed is:

1. An engine life predicting apparatus comprising:
    a detecting block including
        a current detector that detects a current value outputted from a generator with an engine as a power source, and
        a voltage detector that detects a voltage value outputted from said generator;
    an operating block that weights an operating time of said engine by using a weight constant determined so as to correspond said current value and said voltage value to a weighting table in which a current and a voltage outputted from said generator are employed as a vertical axis and a horizontal axis and said weight constant is set to correspond to a combination of said current and said voltage, and that integrates weighted said operating time to calculate an integral time; and
    a judging block that judges a residual life of said engine by comparing said integral time and previously set at least one reference values.

2. The engine life predicting apparatus according to claim 1, further comprising a converter that converts alternating current outputted from said generator into direct current,
    wherein said detecting block is connected to at least an output side of said converter.

3. An engine life predicting apparatus according to claim 1, further comprising:
    a power conversion device that converts alternating-current power outputted from said generator; and
    a power conversion device controller that restricts a maximum output frequency of said power conversion device when said judging block judges that said integral time exceeds said at least one reference values.

4. An engine life predicting apparatus according to claim 3, wherein
the power conversion device controller restricts at least one of a output power and a output frequency of said power conversion device when said judging block judges that said integral time exceeds said at least one reference values,
said at least one reference values includes a plurality of previously set reference values, and
said power conversion device controller restricts at least one of said output power and said output frequency to a first value when an integral time exceeds a first reference value, and restricts at least one of said output power and said output frequency to a second value which is smaller than said first value when said integral time exceeds a second reference value which is larger than said first reference value.

5. The engine life predicting apparatus according to claim 3, further comprising a load that is supplied with power from said power conversion device,
wherein said detecting block is connected to an output side of said power conversion device, and said current detector detecting a second current value from said power conversion, and said voltage detector detecting a second voltage value from said power conversion,
said operating block weights an operating time of said load by using a second weight constant determined on the basis of said second current value and said second voltage value and integrates the weighted operating time of said load to calculate an integral time of said load, and
said judging block compares said integral time of said load and previously set at least one second reference values to judge a residual life of said load.

6. The engine life predicting apparatus according to claim 1, further comprising an indicator that makes an external indication when said judging block judges that said integral time exceeds said at least one reference values.

7. The engine life predicting apparatus according to claim 6,
wherein said at least one reference values includes a plurality of previously set reference values, and
said indicator makes an indication according to each of said plurality of reference values.

8. An engine life predicting apparatus according to claim 1, further comprising:
an engine controller that restricts a maximum number of rotations of said engine when said judging block judges that said integral time exceeds said at least one reference values.

9. The engine life predicting apparatus according to claim 8, wherein said engine controller stops said engine when said judging block judges that said integral time exceeds said at least one reference values.

10. An engine life predicting apparatus according to claim 8, wherein
the engine controller restricts at least one of a output and a number of rotations of said engine when said judging block judges that said integral time exceeds said at least one reference values,
said at least one reference values includes a plurality of previously set reference values, and
said engine controller restricts at least one of the output voltage and the number of rotations of said engine to a first value when an integral time exceeds a first reference value, and restricts at least one of said output voltage and said number of rotations of said engine to a second value which is smaller than said first value when said integral time exceeds a second reference value which is larger than said first reference value.

11. The engine life predicting apparatus according to claim 1, further comprising
a converter that converts alternating current outputted from said generator into direct current, and
a converter controller that restricts a maximum output voltage of said converter when said judging block judges that said integral time exceeds said at least one reference values, wherein
said detecting block is connected to at least an input side of said converter.

12. The engine life predicting apparatus according to claim 2, further comprising a converter controller that restricts a maximum output voltage of said converter when said judging block judges that said integral time exceeds said at least one reference values.

13. An engine life predicting apparatus according to claim 11, wherein
said at least one reference values includes a plurality of previously set reference values, and
said converter controller restricts the maximum output voltage to a first value when an integral time exceeds a first reference value, and restricts said maximum output voltage to a second value which is smaller than said first value when said integral time exceeds a second reference value which is larger than said first reference value.

14. An engine life predicting apparatus according to claim 12,
wherein said at least one reference values includes a plurality of previously set reference values, and
said converter controller restricts the maximum output voltage to a first value when an integral time exceeds a first reference value, and restricts said maximum output voltage to a second value which is smaller than said first value when said integral time exceeds a second reference value which is larger than said first reference value.

15. The engine life predicting apparatus according to claim 1, wherein said generator drives a motor.

16. The engine life predicting apparatus according to claim 1, further comprising a nonvolatile recording medium that is replaceable and in which said integral time is recorded.

17. A refrigerating apparatus comprising:
an engine life predicting apparatus including
a detecting block including
a current detector that detects a current value outputted from a generator with an engine as a power source, and
a voltage detector that detects a voltage value outputted from said generator;
an operating block that weights an operating time of said engine by using a weight constant determined so as to correspond said current value and said voltage value to a weighting table in which a current and a voltage outputted from said generator are employed as a vertical axis and a horizontal axis and said weight constant is set to correspond to a combination of said current and said voltage, and that integrates weighted said operating time to calculate an integral time; and
a judging block that judges a residual life of said engine by comparing said integral time and previously set at least one reference value.

* * * * *